United States Patent
Mallernee et al.

(10) Patent No.: US 6,412,436 B1
(45) Date of Patent: Jul. 2, 2002

(54) MOUNTING FIXTURE FOR MAKING POLYMERIC GLOVES

(75) Inventors: Rick M. Mallernee, Bucyrus; John A. Bordas, Greenwich, both of OH (US)

(73) Assignee: Mapa Pioneer Corporation, Brunswick, OH (US)

( * ) Notice: Subject to any disclaimer, the term of this patent is extended or adjusted under 35 U.S.C. 154(b) by 0 days.

(21) Appl. No.: 09/689,380

(22) Filed: Oct. 12, 2000

Related U.S. Application Data

(63) Continuation-in-part of application No. 09/334,345, filed on Jun. 16, 1999, now Pat. No. 6,159,532.

(51) Int. Cl.⁷ .............................................. B05C 13/02
(52) U.S. Cl. ......................... 118/33; 118/500; 118/503
(58) Field of Search ............................... 118/33, 44, 52, 118/72, 320, 500, 503; 427/421, 2.3, 180, 181; 264/129, 301, 307, 340; 134/16, 22.1

(56) References Cited

U.S. PATENT DOCUMENTS

| | | | |
|---|---|---|---|
| 2,120,406 A | | 6/1938 | Hansen |
| 3,992,221 A | | 11/1976 | Homsy et al. |
| 4,190,685 A | | 2/1980 | Hart et al. |
| 4,997,403 A | * | 3/1991 | Akman ........................ 446/220 |
| 5,129,256 A | * | 7/1992 | McGlothlin ..................... 73/40 |
| 5,168,010 A | | 12/1992 | Hashmi |
| 5,374,389 A | * | 12/1994 | Friedrich ..................... 264/503 |
| 5,493,899 A | | 2/1996 | Beck et al. |
| 6,253,383 B1 | * | 7/2001 | Mallernee et al. ........... 2/161.7 |

FOREIGN PATENT DOCUMENTS

| | | |
|---|---|---|
| WO | 96/23428 | 8/1996 |
| WO | 98/25747 | 6/1998 |
| WO | 00/09590 | 2/2000 |

* cited by examiner

Primary Examiner—Fred J. Parker
(74) Attorney, Agent, or Firm—Marshall, Gerstein & Borun

(57) ABSTRACT

A mounting fixture for making a chemical-resistant protective glove has a seal configured to seal the open end of a glove base so the glove base can be inflated. The seal can include a seal that inflates to press against a peripheral sealing ring. An air inlet enables the glove base to be inflated while secured in place on the fixture. A light enables the interior of the glove base to be illuminated, and seals and connections are provided enabling the fixture to be rotated while the glove base is inflated. The glove base can be rotated as a spray coating is applied, and a lamp lights the interior of the glove base as it is rotated and sprayed to assist the operator to identify unsprayed areas.

14 Claims, 3 Drawing Sheets

MOUNTING FIXTURE FOR MAKING POLYMERIC GLOVES

This is a continuation-in-part application of serial no. 09/334,345, filed Jun. 16, 1999 which was issued as U.S. Pat. No. 6,159,532 on Dec. 12, 2000.

BACKGROUND OF THE INVENTION

This invention relates generally to protective gloves and more particularly to chemical-resistant protective gloves.

Polymers such as polychloroprene, acrylonitrile, natural or synthetic isoprene, and butyl rubber provide relatively inexpensive and useful materials for making protective gloves. Gloves can be made by injection molding or by dipping a glove former into a vat of such polymers.

Because polymers have different characteristics, it has in the past been found useful to make composite gloves of successive laminations of different materials. U.S. Pat. No. 5,459,880, for example, teaches that a glove with high strength and oil resistence can be made at a low cost by successively immersing a glove former in two different rubber latexes.

It is also known that some fluoroelastomeric materials, such as the commercially-available VITON® or TECHNI-FLON® fluoroelastomers, can be used to provide improved chemical resistance to a wide variety of toxic corrosive chemicals and solvents, radiation, and flammablity. U.S. Pat. No. 4,218,779 describes the desirability of using such materials as the outer layer of a protective glove.

Unfortunately, the cost and physical characteristics of many fluoroelastomeric materials make the conventional successive-immersion process impractical as a method for applying a fluoroelastomeric coating on a glove. Apparently unable to find a cost-effective way to add a thin layer of fluoroelastomeric material over a less-expensive polymeric base, some manufacturers have chosen to make gloves entirely of the more expensive fluoroelastomeric material.

Fluoroelastomeric materials tend to create a very smooth, slick surface on gloves. This surface reduces grip when handling wet objects. The smooth, slick surfaces of such gloves also tend to adhere to one another when the gloves are packaged, making it difficult to subsequently separate the gloves. In order to overcome adhesion problems and to allow the gloves to don more easily, most fluoroelastomeric gloves are powdered inside.

There is a long-felt need for a cost-effective way to add a thin layer of fluoroelastic material over a polymer glove base, and for a fluoroelastomer-coated glove with a non-adhesive finish that will increase wet gripping and allow the gloves to be sold free of powder.

SUMMARY OF THE INVENTION

The invention relates to a mounting fixture that can be used to make gloves having a thin layer of a fluoroelastomeric material on the outside surface of a polymeric glove base. The fluoroelastomeric coating is the dried product of a water-based fluoroelastomeric material that is sprayed onto the glove base during manufacture.

Spraying a finished polymeric glove base with a conventional, solvent-based fluoroelastomeric material could result in the solvents damaging the glove base. Further, spraying a glove base while it remains on a glove former on which the glove base is made would he undesirable because gloves are conventionally formed inside-out on the formers; the surface of the glove next to the former generally becomes the outside surface of the completed glove, while the surface of the glove that faces outwardly while the glove is on the former becomes the insider surface of the completed glove. Accordingly, spraying a glove base while it is still on the former would lead to the fluoroelastomeric coating being applied to what will become the inside surface of the completed glove. Since one of the purposes of the fluoroelastomeric material is to protect the less-resistant polymeric base from external chemicals, applying the fluoroelastomeric material to what will become the inside surface of the completed glove is not particularly desirable. A second problem is that the fingers on the former are too close together to allow easy spraying. Further, material that is oversprayed onto the glove former could spoil subsequent glove bases made on that former.

A novel mounting fixture has been developed to enable a thin fluoroelastomeric layer to be sprayed on the outside surface of a glove base. After the glove base is first prepared, cured, and removed from its former, it is placed on the mounting fixture with the final outside surface facing out. The fixture has a seal and a sealing ring for sealingly engaging the open end of the glove base. It also has a means for inflating the glove base while it is on the mounting frame. Inflating the glove causes the fingers to spread, making it easier to cover the surface of the glove base with the spray.

After the initial coating is applied, a final, atomized spray of the fluoroelastomeric material can be used to give a matte finish to the completed glove. The matte finish does not have the adhesive characteristics of conventional fluoroelastomic gloves, facilitating handling.

DETAILED DESCRIPTION OF THE INVENTION

Figure 1:
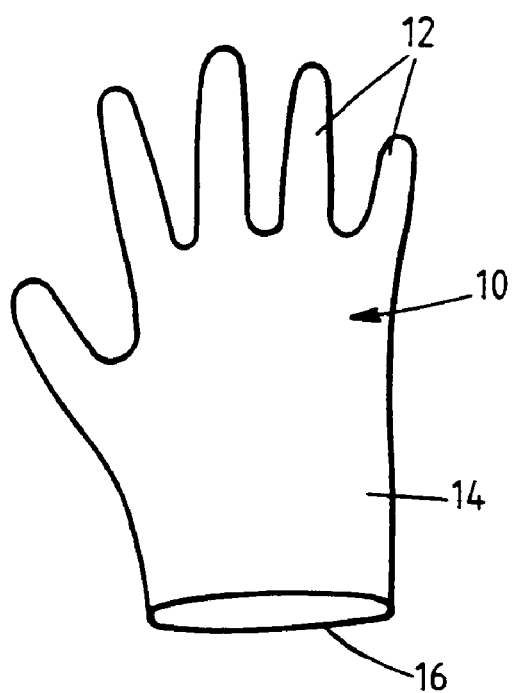
FIG. 1 is a plan view of a polymeric glove with a thin fluoroelastomeric coating.
Figure 2:
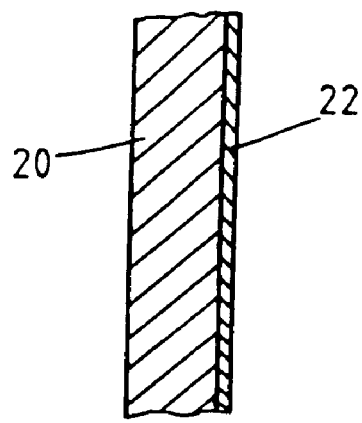
FIG. 2 is a sectional view of a wall of the glove of FIG. 1.

FIG. 1 shows a protective glove 10 that can be made on the fixture of the present invention. As illustrated, the glove has fingers 12 and a cuff 14 with an open lower end 16. As seen in FIG. 2, the walls of the glove include a glove base 20 next to the wearer's skin, with a thin fluoroelastomeric coating 22 on the outside surface. The coating is less than 0.010 inches thick, and may have a matte finish. The glove base can be made of any of a variety of polymers, including acrylonitrile, chloroprene, or natural latex. The fluoroelastomer used in the coating is preferably one that provides good resistance to a wide variety of toxic corrosive chemicals and solvents. A copolymer of vinylidene fluoride, hexafluoropropylene, and tetrafluoropropylene, such as one of those sold by DuPont under its VITON® trademark, may be particularly useful.

The glove base 20 is made in any conventional way. For example, a glove former of an appropriate shape can be dipped into a vat of polymer. Upon removing the former from the vat, a layer of polymer remains on the former. The former can then be placed in an oven to harden or vulcanize the polymer, forming the glove base that can then be readily removed from the glove former. The primary purpose of this vulcanization is to strengthen the glove base sufficiently so that it can be removed from the glove former without being damaged, and so that its full protective properties can be realized. It may not be necessary to complete the vulcanization of the glove base at this time.

Figure 3:
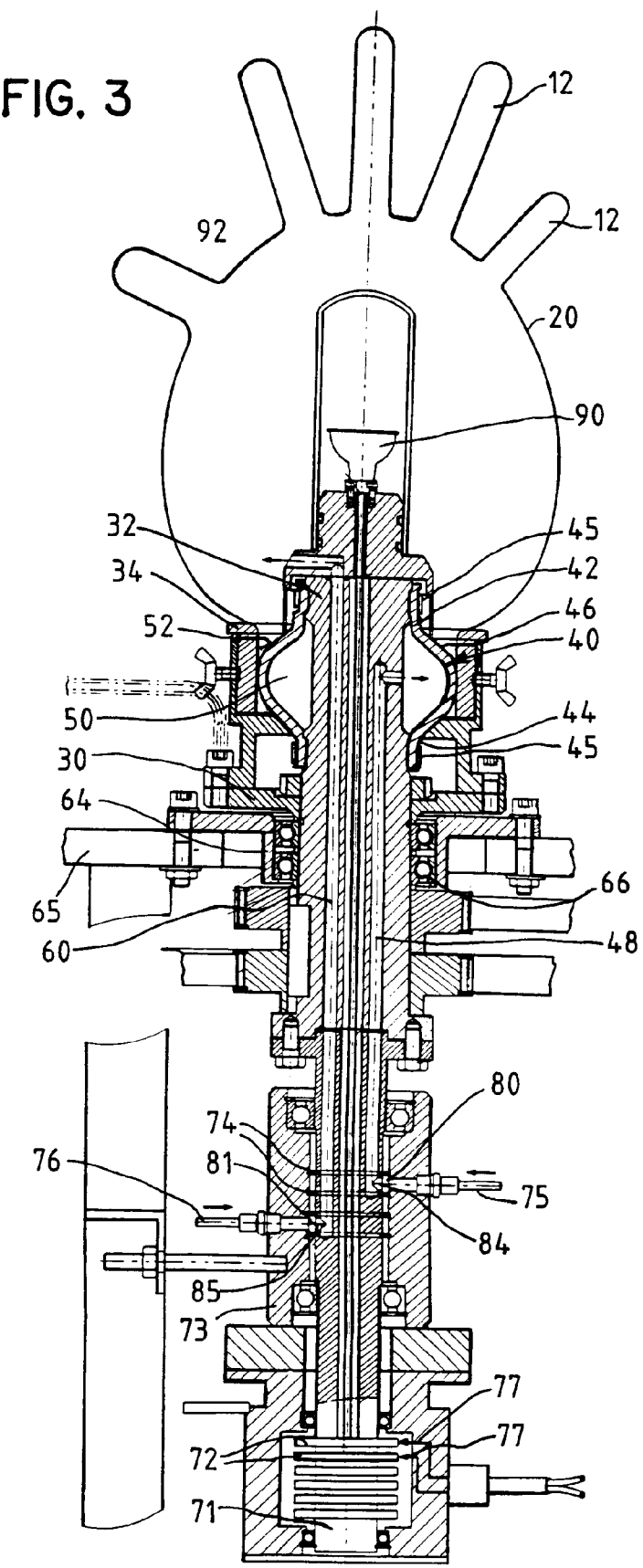
FIG. 3 is a sectional view of a mounting fixture in accordance with the present invention.

To apply the fluoroelastomeric coating 22, the open lower end 16 of the glove base 20 is placed over a mounting fixture 30, such as the one seen in FIG. 3. As illustrated, the mounting fixture includes a mounting neck 32 within a sealing ring 34. The open lower end of the glove base slides over the mounting neck into an annular recess between the mounting neck and the sealing ring. After the lower end of the glove base is positioned over the mounting neck, a seal on the mounting neck is activated, pressing the lower end of the glove base against the sealing ring and, as a result, sealingly engaging the glove base to the mounting fixture and temporarily creating an air-tight seal of the open lower end of the glove base. In the illustrated fixture, the seal takes the form of a flexible membrane 40 that is disposed over the mounting neck. The membrane has upper and lower portions 42, 44 that are secured to the mounting neck by, for example, bands 45. A central section 46 of the membrane remains unsecured to the mounting neck. A conduit 48 leads from a margin 50 between the mounting neck and the central section of the membrane to a fluid source (here, an air source) that can be used to inflate the central section of the membrane. The sealing ring is preferably lined with a facing 52 made from an elastomeric material. Of course, the seal and sealing ring could be made in different shapes or forms, and many other structures or methods could be used to secure the glove base to the mounting fixture and to temporarily seal the lower open end of the glove.

Figure 4:
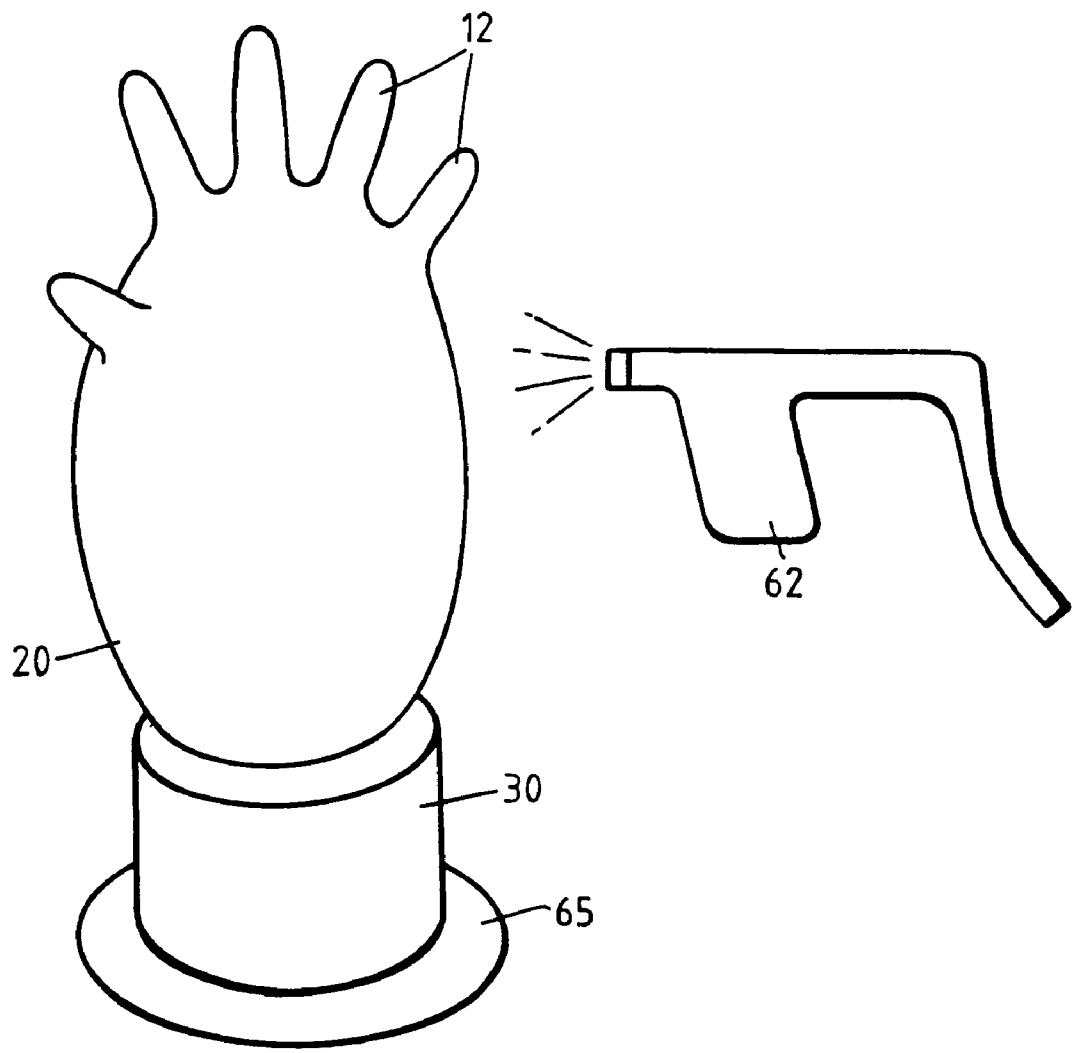
FIG. 4 is a view of a glove base being sprayed with a fluoroelastomic coating.

A passage 60 through the mounting neck 32 of the mounting fixture 30 is attached to another fluid source (here, another air source). The passage provides an inlet for inflating the glove base 20 after it is secured to the mounting fixture. Preferably, enough fluid is added through the pipe to remove wrinkles from the glove base and to cause the ends of the fingers 12 to spread about 15 to 20 mm. apart, as seen in FIG. 4. Too much gas will, of course, cause the glove to burst or by off the mounting neck, while too little gas will result in the fingers remaining too close together for effective spraying. With a 0.011 inch thick glove base, gas pressure in the glove may be preferably about 0.5 to 1.0 psi.

As seen in FIG. 4, the fluoroelastomeric material used to create the coating 22 is preferably a water-based emulsion that is sprayed onto the glove base while the glove base 20 is positioned, in an inflated state, on the mounting fixture 30. While a solvent-based emulsion might also be used, care may need to be taken to assure that the solvent in the spray does not damage the glove base. Spraying a solvent-based emulsion might also require special steps to prevent environmental damage.

The fluoroelastomeric material may be applied with a hand-held paint spray gun 62 using forced air. As seen in FIG. 3, the mounting fixture 30 preferably includes a sleeve 64 through a working surface 65, and the mounting neck is mounted for rotation within the sleeve. In the fixture illustrated in FIG. 3, bearings 66 enable the mounting neck to be rotated a full 360°, allowing an operator to spray all desired parts of the glove base with a minimum of operator movement. A motor (not seen) can be used to rotate the mounting neck, and the speed of rotation can be varied electronically.

Any suitable connection can be used to enable rotation of the fluid and power lines to the rotating mounting neck 32. The illustrated embodiment of the invention, for example, includes a rotating stem 71 that has peripheral electrical pick-ups 72 and is mounted for rotation within a stationary sleeve 73. O-rings 74 define first and second annular chambers 80, 81 between the rotating stem and the stationary sleeve. The stationary sleeve includes a first fluid supply line 75 to the first annular chamber, a second fluid supply line 76 to the second annular chamber, and brushes 77 that provide electrical connection to the electrical pick-ups. The conduit 48 that is used to provide fluid for the seal 40 that secures the open lower end 16 of the glove base 20 to the mounting neck extends into the rotating stem 71, as does the passage 60 used to provide fluid for inflating the glove base. The conduit used for securing the glove base includes an opening 84 to the first annular chamber 80, while the passage used to inflate the glove base includes a separate opening 85 to the second annular chamber 81. Thus, the conduit and passage remain in fluid communication with the stationary fluid supply lines as the rotating stem rotates within the stationary sleeve.

The fixture 30 may also include means for lighting the interior of the glove base while it is being sprayed and rotated. Interior lighting illuminates unsprayed areas of the glove base, enabling the operator to easily detect any areas that have been missed during spraying. In the fixture illustrated, a lamp 90 is mounted to a central portion of the mounting neck 32. A cage 92 is used to maintain separation between the lamp and the glove base.

Preferably, the fluoroelastomeric coating 22 on the completed glove 10 is 0.003–0.004 inches thick, and is created by spraying a series of thin coatings of the desired fluoroelastomer onto the glove base 20. Sufficient time is left between coatings to allow the previous coating to dry. For example, two minutes of air drying may be allowed between coatings, but drying time may be affected by the local environment.

Preferably, the final coating of spray is applied with a reduced output of fluoroelastomeric emulsion and a relatively high airflow from the spray gun. This results in a matte surface on the completed glove that is less sticky, reducing the problem of gloves sticking together when packaged.

After the final coating is sprayed, the glove 10 may remain inflated on the mounting fixture 30 for preliminary drying. Again, two minutes may be allowed, but the local environment may affect the drying time. After the preliminary drying, the glove 10 may be slowly deflated (for example, over a period of 20 to 30 seconds) by opening a valve on an evacuation line. After deflation, the gloves can be removed from the mounting fixture 30.

After removal from the fixture 30, the glove can then be internally supported by a vertical mandrel and placed in an oven for further drying and vulcanization of the fluoroelastomeric coating 22. For example, the glove may be dried and vulcanized in a 212 degree Fahrenheit oven for one hour. The required time and temperature may of course vary. For example, better cross-linking may be obtained by using a higher temperature, but care must be taken to avoid damaging the polymeric glove base 20. When the glove base is made of acrylonitrile, one-hour vulcanization of the fluoroelastomer coating may be performed at a temperature as high as 260 degrees Fahrenheit.

After vulcanization, the glove 10 may be removed from the oven and may be inspected over a light tube. Areas that the spray coating did not sufficiently cover are easily seen over such a light, and can be marked for re-spraying and vulcanization.

No unnecessary limitations should be read into what has been described. The scope of protection is as claimed below. Modifications should be obvious to those skilled in the art.

We claim:

1. A mounting fixture for use in applying a coating to a glove base, the fixture comprising:
   a mounting neck that has a seal surface;
   a sealing ring disposed across from the seal surface;
   an activator connected to the seal surface and configured to move the seal surface toward the sealing ring, trapping an open end of the glove base between the sealing ring and the seal surface; and
   an inlet capable of inflating the glove base while it is on the fixture.

2. The mounting fixture of claim 1, further comprising a-lamp capable of lighting the interior of the glove base.

3. The mounting fixture of claim 1, in which a central portion of the mounting neck comprises a lamp and a cage disposed to maintain separation between the lamp and the glove base.

4. The mounting fixture of claim 1, further comprising:
   a lamp on a central portion of the mounting neck;
   a sleeve in which the mounting neck is mounted for rotation;
   a rotatable electrical connection between the lamp and an electrical power source.

5. The mounting fixture of claim 1, in which:
   the seal surface is an inflatable seal on the mounting neck; and
   the activator is configured to inflate the seal to engage against the sealing ring.

6. The mounting fixture of claim 1, in which:
   the seal surface comprises an annular flexible membrane around a central stem, the membrane having upper and lower portions fixed to the central stem, and a central section that is displaceable from the stem; and
   the activator comprises an inlet for a fluid to be injected between the membrane and the stem to press the membrane toward the sealing ring.

7. The mounting fixture of claim 1, further comprising means for rotating the mounting neck.

8. The mounting fixture of claim 1, further comprising:
   a sleeve in which the mounting neck is mounted for rotation; and
   means for rotating the mounting neck within the sleeve.

9. The mounting fixture of claim 1, in which the seal and sealing ring are sufficient to hold a glove base on the mounting neck when the glove base is inflated to an internal pressure of 1.0 psi.

10. A mounting fixture for use in applying a coating to a glove base, the fixture comprising:
    a seal configured to seal an open end of the glove base to a mounting neck;
    an inlet capable of inflating the glove base while it is on the fixture;
    a lamp on a central portion of the mounting neck; and
    a cage disposed around the lamp.

11. The mounting fixture of claim 10, in which the seal comprises:
    a sealing ring;
    a seal surface; and
    an activator capable of activating the seal surface to engage against the sealing ring.

12. The mounting fixture of claim 10, in which the seal comprises:
    a sealing ring spaced apart from the mounting neck;
    an annular seal surface on the mounting neck; and
    an activator capable of activating the seal surface to engage against the sealing ring.

13. The mounting fixture of claim 10, further comprising:
    a rotatable electrical connection between the lamp and an electrical power source.

14. The mounting fixture of claim 10, further comprising:
    means for rotating the mounting neck while the lamp is on.

* * * * *

UNITED STATES PATENT AND TRADEMARK OFFICE
CERTIFICATE OF CORRECTION

PATENT NO.     : 6,412,436 B1
DATED          : July 2, 2002
INVENTOR(S)    : Mallernee et al.

It is certified that error appears in the above-identified patent and that said Letters Patent is hereby corrected as shown below:

Column 5,
Line 14, replace "a-lamp" with -- a lamp --.

Signed and Sealed this

Twenty-eighth Day of January, 2003

JAMES E. ROGAN
*Director of the United States Patent and Trademark Office*